(12) United States Patent
Karasawa et al.

(10) Patent No.: US 7,329,007 B2
(45) Date of Patent: Feb. 12, 2008

(54) PROJECTOR

(75) Inventors: Joji Karasawa, Okaya (JP); Hidemasa Yamakawa, Matsumoto (JP); Kanji Yoshida, Azumino (JP); Masafumi Sakaguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 146 days.

(21) Appl. No.: 11/243,333

(22) Filed: Oct. 5, 2005

(65) Prior Publication Data

US 2006/0072209 A1    Apr. 6, 2006

(30) Foreign Application Priority Data

Oct. 6, 2004    (JP)    ............... 2004-293319

(51) Int. Cl.
| G03B 21/00 | (2006.01) |
| G03B 21/14 | (2006.01) |
| G03B 21/26 | (2006.01) |
| G03B 21/28 | (2006.01) |
| G03B 5/04  | (2006.01) |

(52) U.S. Cl. ...................... 353/31; 353/33; 353/34; 353/69; 353/81; 353/84; 359/833; 359/834; 359/837

(58) Field of Classification Search ............ 353/31, 353/33, 34, 69, 81, 84; 359/833, 834, 837
See application file for complete search history.

(56) References Cited

U.S. PATENT DOCUMENTS 5,959,785 A *  9/1999 Adachi ..................... 359/692
6,141,150 A * 10/2000 Ushiyama et al. .......... 359/618
6,590,714 B2 *  7/2003 Sugawara ................... 359/634
6,796,662 B2 *  9/2004 Akiyama .................... 353/102
6,935,753 B2 *  8/2005 Takezawa et al. .......... 353/119
7,156,521 B2 *  1/2007 Kawai et al. ................ 353/20

FOREIGN PATENT DOCUMENTS

| JP | A-11-038210   | 2/1999  |
| JP | A-11-064977   | 3/1999  |
| JP | A-2000-155372 | 6/2000  |
| JP | A-2001-066694 | 3/2001  |
| JP | A-2001-066695 | 3/2001  |
| JP | A-2003-344804 | 12/2003 |
| WO | WO 94/22042 A1 | 9/1994 |

* cited by examiner

*Primary Examiner*—Melissa Jan Koval
(74) *Attorney, Agent, or Firm*—Oliff & Berridge, PLC

(57) ABSTRACT

A projector includes an illumination device, a color separation system, a light combining system, a projection system, and an optical adjustment portion. The color separation system separates the light emitted from the illumination device into blue light, red light, and green light. The light combining system can have a first dichroic filter reflecting one of blue light or red light, and a second dichroic filter reflecting green light which are placed in a crossed state and can combine image lights of respective colors exiting from the first through third light modulation devices. The projection system can project a combined light exiting from the light combining system while correcting chromatic aberrations of magnification of blue light and red light with respect to green light. The optical adjustment portion can adjust a size of an image light corresponding to the green light of the combined light exiting from the light combining system.

12 Claims, 7 Drawing Sheets

F I G. 3
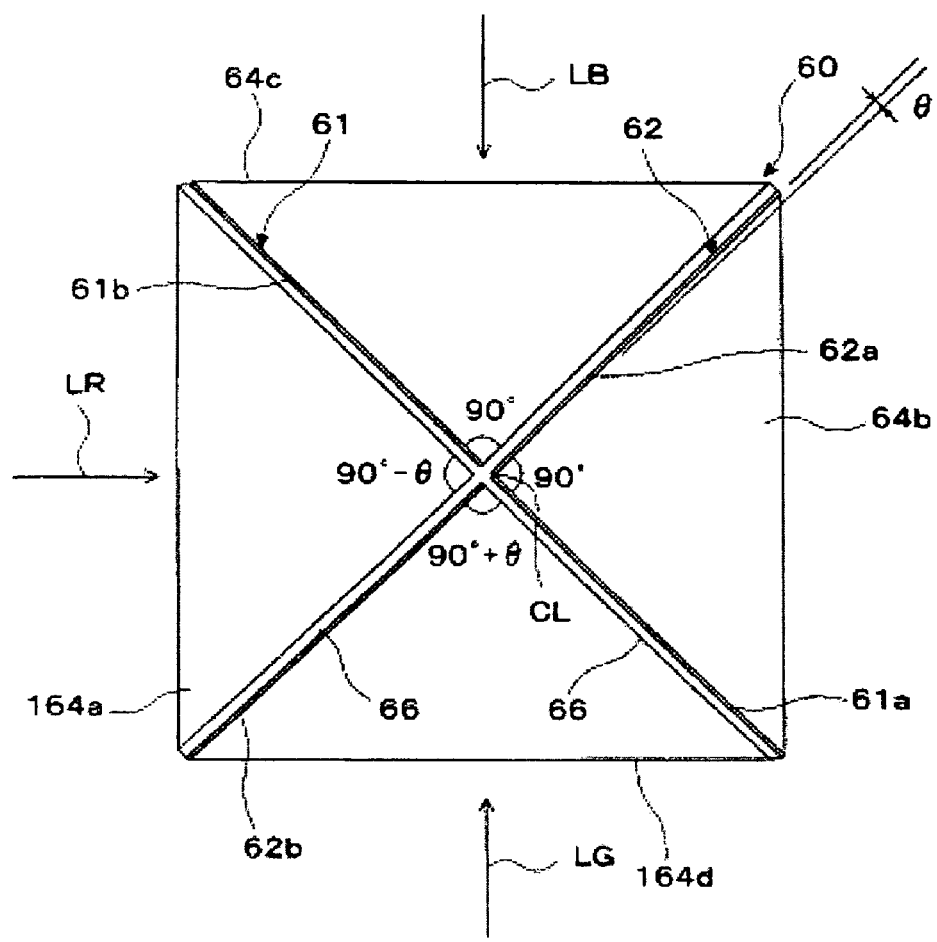

F I G. 8
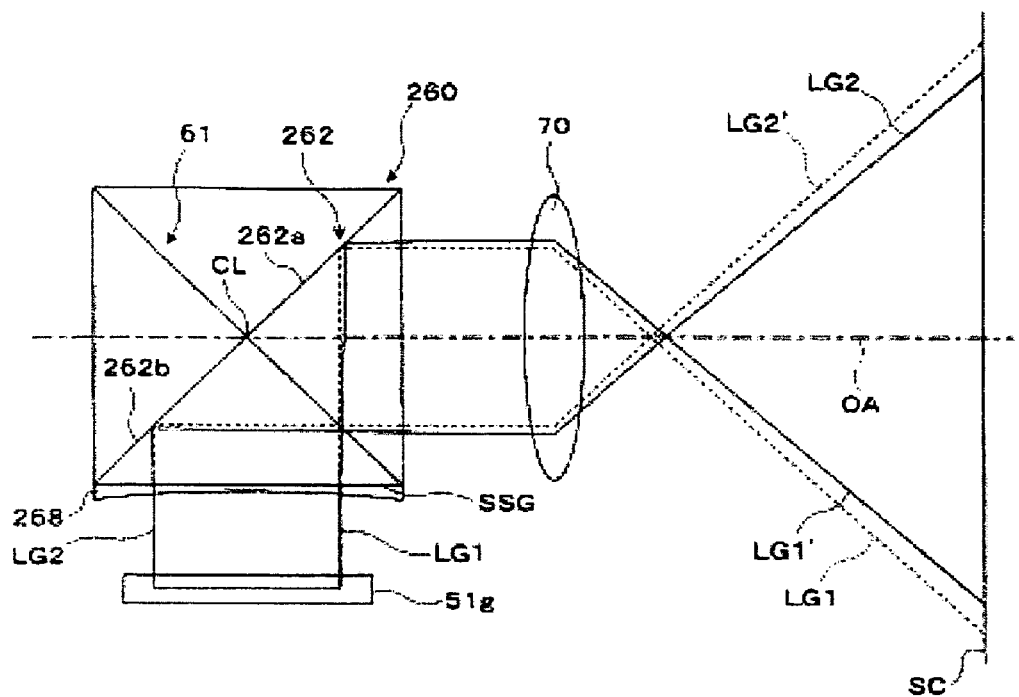

PROJECTOR

BACKGROUND

This application claims the benefit of Japanese Patent Application No. 2004-293319, filed Oct. 6, 2004. The entire disclosure of the prior application is hereby incorporated by reference herein in its entirety.

Aspects of the invention can relate to a projector that projects an image using a light modulation device, such as a liquid crystal panel.

A projector in the related art illuminates liquid crystal panels of respective colors. Hence, a projector of a type, such as those disclosed in JP-A-11-64977, JP-A-11-38210, JP-A-2003-344804, and JP-A-2001-66694, separate a light source light from the light source into lights of three colors, and includes a relay system disposed in an illumination optical path for blue to compensate for a difference of the optical path with respect to lights of the other two colors. More specifically, a first related art projector disclosed in JP-A-11-64977 can be configured to utilize blue lights effectively by allowing the relay lens in the center of three relay lenses forming the relay system to move, for example, in the optical axis direction for scaling up and down the size of an illumination region with respect to the liquid crystal panel. A second related art projector disclosed in JP-A-11-38210 corrects a chromatic aberration for red with ease by narrowing the lateral width of a projected image for red, for example, by tilting a dichroic filter for reflecting red lights incorporated in a light combining cross dichroic prism on one side in reference to the cross line to form a convex surface. A third related art projector disclosed in JP-A-2003-344804 corrects a chromatic aberration of magnification, which is resulted from a difference of magnification of the projection lens for respective colors, by laminating lenses on the light exiting surfaces of the respective liquid crystal panels for adjusting projection magnification using the functions of these lenses. Further, a fourth related art projector disclosed in JP-A-2001-66694 corrects a chromatic aberration of magnification of the projection lens by forming chromatic magnification correction lenses integrally with the light incident surfaces of a plastic color combining prism on the sides of the optical paths for blue and red for adjusting projection magnification using the functions of these lenses.

A projector in the related art of another type, such as those disclosed in JP-A-2001-66695 and JP-A-2000-155372, separates a light source light from the light source into lights of three colors and includes a relay system disposed in the illumination optical path for red to compensate for a difference of the optical path with respect to the other two colors. A fifth related art projector disclosed in JP-A-2001-66695 suppresses the occurrence of a chromatic aberration of magnification of the projection lens by providing correction lenses between the respective liquid crystal panels and a three-color combining prism. Also, a sixth related art projector disclosed in JP-A-2000-155372 corrects a chromatic aberration of magnification of the projection lens by giving a curvature to the surface of the sandwich glass holding a wavelength film disposed between the reflective liquid crystal element and the three-color combining prism.

Further, a seventh projector in the related art of still another type, such as the one disclosed in WO94/22042, separates a light source light from a white light source into lights of three colors and includes a light guiding system, such as a relay system, disposed in the illumination optical path for green for compensating for a difference of the optical path with respect to the other two colors.

However, for the projector of the type in which the relay system is disposed in the optical path for blue, for example, because the high pressure mercury-vapor lamp is used as the light source, blue may become relatively weak in comparison with the other colors, and the projector of this type may fail to adjust a white balance appropriately. In such a case, the white balance may be achieved through signal processing such that adjusts a luminance value of an image signal that should be inputted into the liquid crystal panel. However, this raises a problem that the brightness and the contrast of an image are deteriorated. When the relay lens provided in the optical path for blue is allowed to move in the optical axis direction, it is possible to lessen a loss of blue lights whose luminance readily becomes insufficient, and wasting of an illumination light can be therefore prevented. This configuration, however, cannot positively eliminate bias of the white balance resulting from the light-emitting characteristic of the high pressure mercury-vapor lamp.

A chromatic aberration of magnification is unavoidable in the projection lens because lights diffuse in individual lenses forming the projection lens. In principle, a red light and a blue light have aberrations in the opposite directions with respect to a green light. Recently, the lens is designed to suppress a chromatic aberration of magnification using a special grinding material, and there is a projection lens in which aberrations of a red light and a blue light with respect to a green light are in the same direction. Correction on a chromatic aberration of magnification, as described above, has been proposed for such a projection lens. However, the projector that guides a blue light to the relay system has problems as follows as to a correction on the chromatic aberration of magnification. That is, in a case where the dichroic filter for reflecting a red light in the color combining prism is tilted on one side in reference to the cross line, the lateral width of a projected image for red can be matched with a lateral width of a projected image for blue. However, in a case where lateral widths of projected images for red and blue are matched with a lateral width of a projected image for green, because the projection lens has an aberration as described above, the dichroic filter for reflecting a blue light needs to be tilted on one side in reference to the cross line in addition to the dichroic filter for reflecting a red light.

The manufacturing of the dichroic prism therefore becomes more complicated, which consequently increases the manufacturing costs. Because only the dichroic filter for one color is tilted, when a chromatic aberration of magnification for one of a red light and a blue light is to be reduced, the chromatic aberration of magnification for the other color becomes to large not to be corrected by merely tilting the filter. In addition, the method of laminating the lenses to the light exiting surfaces of the respective liquid crystal panels has the need to provide special chromatic correction lenses in the optical paths for respective colors. This not only complicates the manufacturing sequence and thereby increases the cost, but also may possibly attenuate a blue light due to the presence of the chromatic correction lens.

In the method of forming a chromatic magnification correction lens integrally with the light incident surface of the plastic color combining prism, processing accuracy of plural chromatic magnification correction lenses formed for respective different color lights have to be increased to achieve sufficient accuracy. This also complicates the manufacturing sequence and thereby increases the cost.

The projector of the type in which the relay system is disposed in the optical path for red has the same problem. That is, red becomes relatively weak in comparison with the other colors, and the projector may fail to adjust a white balance appropriately. In the method of disposing correction lenses of chromatic aberrations of magnification in the optical paths of respective colors in the projector of the type in which the relay system is disposed in the optical path for red, the correction lenses have to be incorporated into plural optical paths. Moreover, the correction lenses may possibly attenuate red lights. The method of giving a curvature to the surface of the sandwich glass also has the need to give curvatures to the surfaces of sandwich glass in plural optical paths. Furthermore, red lights may possibly be attenuated.

The projector in which the relay system is disposed in the optical path for green has advantages in that intensity of green lights, which are often superfluous due to the light-emitting characteristic of the high pressure mercury-vapor lamp used as the light source, can be readily reduced, and that adjustment of color temperatures, to which the demanding level is increasing in recent years, can be performed with relative ease. However, as with the projectors in which the relay system is disposed in the optical path for red or blue, chromatic aberrations of magnification for three colors cannot be corrected easily. More specifically, in a case where chromatic aberrations of magnification for three colors are to be corrected, for example, the enlarged sizes for red and green are matched with the enlarged size for blue. In this case, however, not only the dichroic filter for reflecting red lights, but also the dichroic filter for reflecting green lights needs to be tilted on one side. This complicates the manufacturing of the cross dichroic prism and increases the cost. In the method of disposing chromatic correction lenses in plural optical paths, at least two lenses are necessary. This also complicates the manufacturing sequence of the cross dichroic prism and thereby increases the cost.

SUMMARY

An aspect of the invention can provide a projector capable achieving a natural white balance at high luminance while reducing signal processing using a luminance value to the least possible level even when a lamp light source, such as a high pressure mercury-vapor lamp, having a specific tendency for the spectrum characteristic, is used.

Another aspect of the invention can provide a projector capable achieving chromatic correction with ease for respective colors of RGB without increasing the manufacturing costs of the dichroic prism and the like.

An exemplary projector according to an aspect of the invention can include an illumination device that emits an illumination light, a color separation system that separates the illumination light emitted from the illumination device into a blue light, a red light, and a green light, and guides the blue light and the red light, respectively, to first and second optical paths, and the green light to a third optical path in which a relay system is provided, first through third light modulation devices that are provided, respectively, in the first through third optical paths, and illuminated by the blue light, the red light, and the green light, respectively, a light combining system that has a first dichroic filter reflecting one of the blue light and the red light, and a second dichroic filter reflecting the green light which are placed in a crossed state, and combines image lights of respective colors exiting from the first through third light modulation devices to go incident on the first and second dichroic filters in specific directions that differ from each other, a projection system that projects a combined light exiting from the light combining system while correcting chromatic aberrations of magnification of the blue light and the red light with respect to the green light to have a same sign, and an optical adjustment portion that adjusts a size of an image light corresponding to the green light of the combined light exiting from the light combining system in response to a size of image lights corresponding to the blue light and the red light. The relay system can be provided in the third optical path because a distance from the illumination device to the third light modulation device is longer than a distance from the illumination device to the first light modulation device and a distance from the illumination device to the second light modulation device. The relay system can be provided to prevent or reduce deterioration of efficiency for utilization of lights caused by a difference of these distances.

In the exemplary projector, the optical adjustment portion adjusts the size of an image light corresponding to a green light in response to the sizes of the image lights corresponding to the other color lights. Hence, even when a chromatic aberration of magnification occurs in the projection system for a green light with respect to the other color lights, the chromatic aberration of magnification can be cancelled out between the former and the latter colors. The occurrence of a chromatic aberration of magnification on a projected image can be therefore suppressed. In other words, because chromatic corrections can be achieved readily for respective colors including blue, red, and green while suppressing an increase of the manufacturing costs, it is possible to project a high-quality image by lessening the positional shift of the projected pixels of the respective colors.

Because the relay system is disposed in the third optical path of the green light in this projector, the green light is readily lost. However, this may actually become advantageous in achieving a natural white balance for a lamp light source in which a light quantity of green lights is large. In addition, in this case, because visual sensitivity to green lights is relatively high, green lights give considerable influences to a white balance. However, illuminance of green lights on the third light modulation device can be readily adjusted by adjusting the relay system in the third optical path as needed. In other words, because the illuminance of green lights can be adjusted without the need to use an ND filter or the like known as a usual measure for adjusting the white balance, it is possible to adjust the white balance accurately and appropriately without deteriorating the contrast.

In particular, the projection system can correct the chromatic aberrations of magnification of the blue light and the red light with respect to the green light to be equal or nearly equal and to have the same sign. In this case, the chromatic aberrations of magnification can be corrected exactly between the blue light and the red light, and a high-quality image having less chromatic shift can be projected. In addition, the projection system can be designed and manufactured easily because the occurrence of chromatic aberrations of magnification of the red light and the blue light is allowed. When the chromatic aberrations of magnification of the blue light and the red light with respect to the green light are positive, the projection magnification of these colors becomes smaller than the projection magnification of the green light. When the chromatic aberrations of magnification of the blue light and the red light with respect to the green light are negative, the projection magnification of these colors becomes larger than the projection magnification of the green light.

In particular, projection magnification of the blue light and the red light is smaller than projection magnification of the green light in the projection system. In this case, the optical adjustment portion is furnished with the function of reducing the size of an image light of the green light. It is relatively easy to lower the relative projection magnification of the green light on an optical design basis.

In particular, the optical adjustment portion is achieved by a specific tilting angle produced between first and second surface regions that are halves of the second dichroic filter divided by the first dichroic filter crossing the second dichroic filter. In this case, the light combining system is a cross dichroic prism, and it is able to adjust the size of an image light for green with ease by adjusting the tilting angle between the first and second surface regions forming the second dichroic filter.

Specifically, a cross line between the first and second surface regions can extend in a direction perpendicular to a longitudinal direction of an image projected from the projection system. In this case, because the size of an image light for green is adjusted in the longitudinal direction of the image, it is possible to project an image in which chromatic shift is less noticeable.

In particular, the optical adjustment portion can be an optical element shaped like a lens provided in an optical path from the third light modulation device to the second dichroic filter. In this case, the size of an image light for green can be adjusted continuously in both the lateral and longitudinal directions of an image projected from the projection system. It is thus possible to project an image across which chromatic shift is less noticeable.

Specifically, the optical adjustment portion can be achieved by forming a curved surface on the second dichroic filter. In this case, the size of an image light for green projected from the projection system can be adjusted continuously. It is thus possible to project an image in which chromatic shift is less noticeable.

In particular, the relay system can include a first lens disposed on a light incident side, a second lens disposed on a light exiting side, and a third lens disposed between the first and second lenses. In this case, not only is it possible to illuminate the third light modulation device with the green light homogeneously with a relatively small loss, but it is also possible to set the illuminance of a third color light on the third light modulation device with ease by setting the position of the third lens appropriately as needed.

The first dichroic filter can reflect the blue light. In this case, the first and second dichroic filters transmit the red light.

BRIEF DESCRIPTION OF THE DRAWINGS

The invention will be described with reference to the accompanying drawings, wherein like numbers reference like elements, and wherein:

FIG. 3 is a view showing a modification of the dichroic prism shown in FIG. 2A;

FIG. 8 is a perspective view used to describe the structure of a cross dichroic prism according to a third exemplary embodiment.

DETAILED DESCRIPTION OF EMBODIMENTS

Figure 1:
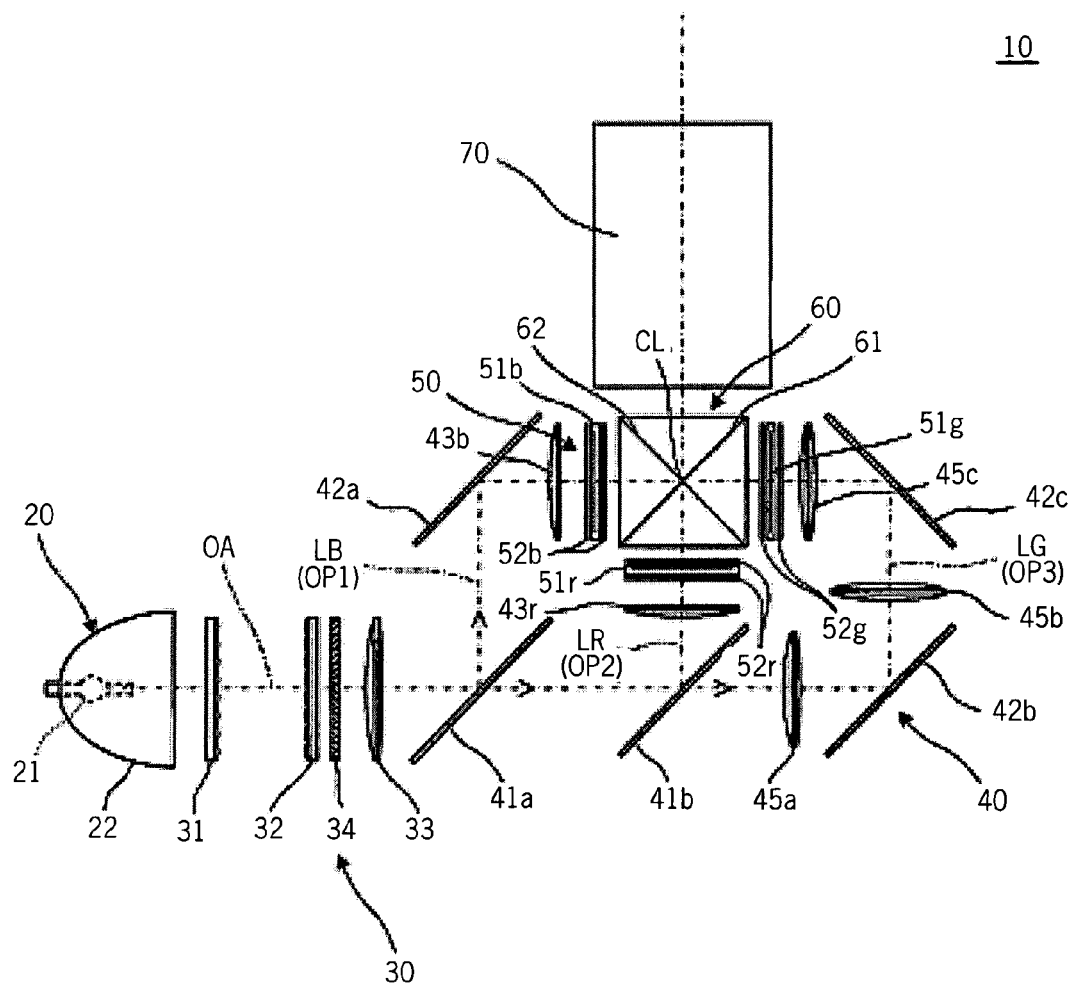
FIG. 1 is a view used to describe optical systems in a projector according to a first exemplary embodiment.

FIG. 1 is a view used to describe a projector according to a first exemplary embodiment of the invention. A projector 10 can include a light source 20 that generates a light source light, a homogenization system 30 that makes an illumination light from the light source 20 homogeneous, a color separation system 40 that separates an illumination light having passed through the homogenization system 30 into lights of three colors including red, green, and blue, a light modulation portion 50 that is illuminated by illumination lights of respective colors exiting from the color separation system 40, a cross dichroic prism 60 that combines modulation lights of respective colors from the light modulation portion 50, and a projection lens 70 that projects an image light having passed through the cross dichroic prism 60 onto a screen (not shown). Of these components, the light source 20 and the homogenization system 30 together function as an illumination device that emits an illumination light.

The light source 20 can include a lamp main body 21 that forms an almost dot-like light-emitting portion and a parabolic concave mirror 22 that collimates a light source light emitted from the lamp main body 21. The lamp main body 21 can include a lamp light source, for example, a high pressure mercury-vapor lamp, and generates an almost white light source light. The concave mirror 22 reflects a light emitted from the lamp main body 21, so that it goes incident on the homogenization system 30 in the form of a parallel light. The parabolic concave mirror 22 may be replaced by a non-parabolic concave mirror having, for example, a spherical surface or an ellipsoidal surface. When such an alternative concave mirror is used, a parallel light flux can be emitted from the light source 20 by disposing a parallelizing lens between the concave mirror 22 and the homogenization system 30.

The homogenization system 30 can include a pair of fly-eye systems 31 and 32, a superimposing lens 33 that superimposes wavefront split lights, and a polarization conversion member 34 that converts an illumination light to specific polarization components. The pair of fly-eye systems 31 and 32 can include plural element lenses arrayed in a matrix fashion. An illumination light from the light source 20 is divided by these element lenses, and the divided lights are collected or diffused separately. The polarization conversion member 34 converts an illumination light exiting from the fly-eye optical systems 31 and 32 to a polarized light of one kind (for example, only an S-polarized component perpendicular to the sheet surface of FIG. 1) and supplies the polarized light to the optical system in the following stage. The superimposing lens 33 focuses illumination lights having passed through the polarization conversion member 34 as a whole from time to time, and thereby enables superimposed illumination for light modulation devices of respective colors provided in the light modulation portion 50. In other words, illumination lights having passed through the both fly-eye systems 31 and 32 and the superimposing lens 33 pass through the color separation system 40 described in detail below, and are then superimposed to illuminate homogeneously image forming regions of the light modulation devices of respective colors forming the light modulation portion 50, that is, liquid crystal panels 51b, 51r, and 51g of respective colors.

The color separation system 40 can include first and second dichroic mirrors 41a and 41b, reflection mirrors 42a, 42b, and 42c, field lenses 43r and 43b, and first through third lenses 45a, 45b, and 45c. Of the lights of three colors including red, green, and blue (RGB), the first dichroic mirror 41a reflects a blue light LB and transmits a green light LG and a red light LR. Also, of the incident green light LG and red light LR, the second dichroic mirror 41b reflects the red light LR and transmits the green light LG. In the color separation system 40, an illumination light from the light source 20 that exits by passing through the homogenization system 30 first goes incident on the first dichroic mirror 41a. The blue light LB reflected on the first dichroic mirror 41a is guided to a first optical path OP1, and goes incident on the field lens 43b used to adjust an angle of incidence by way of the reflection mirror 42a. The red light LR that has passed through the first dichroic mirror 41a and been reflected on the second dichroic mirror 41b is guided to a second optical path OP2 and goes incident on the field lens 43r. Further, the green light LG having passed through the second dichroic mirror 41b is guided to a third optical path OP3, and passes through the first through third lenses 45a, 45b, and 45c by way of the reflection mirrors 42b and 42c. The relay system can include these lenses 45a, 45b, and 45c, and be disposed in the third optical path OP3 for green having the longest distance among the optical paths from the light source 20 to the liquid crystal panels 51b, 51r, and 51g of respective colors. The relay system prevents or reduces deterioration of efficiency for utilization of lights caused by diffusion of lights or the like, by transmitting an image formed by the first lens 45a almost intact to the third lens 45c via the second lens 45b.

By displacing, for example, the lens 45b in the relay system continuously or gradually along the optical axis, it is possible to change the size of an illumination region at a position of the liquid crystal panel 51g arbitrarily, that is, illuminance of the green light LG on the image forming region of the liquid crystal panel 51g can be changed arbitrarily. To be more specific, illuminance of the blue light LB and the red light LR on the image forming regions of the liquid crystal panels 51b and 51r are invariable and remains the same, whereas illuminance of the green light LG on the image forming region of the liquid crystal panel 51g varies with the position of the lens 45b. By utilizing this nature, it is possible to optically adjust a white balance of an image including lights combined after they passed through the respective liquid crystal panels 51b, 51r, and 51g and projected onto the screen from the projection lens 70.

The light modulation portion 50 can include three liquid crystal panels 51b, 51r, and 51g on which respective three colors of illumination lights LB, LR, and LG go incident, and three sets of polarization filters 52b, 52r, and 52g disposed to sandwich the liquid crystal panels 51b, 51r, and 51g, respectively. For example, the liquid crystal panel 51b for a blue light LB and a pair of polarization filters 52b and 52b sandwiching the liquid crystal panel 51b together form a liquid crystal light valve that modulates the luminance of an illumination light in a two-dimensional manner. Likewise, the liquid crystal panel 51r for a red light LR and the corresponding polarization filters 52r and 52r together form a liquid crystal light valve, and the liquid crystal panel 51g for a green light LG and the corresponding polarization filters 52g and 52g together form a liquid crystal light valve.

In the light modulation portion 50, the blue light LB guided to the first optical path OP1 goes incident on the image forming region of the liquid crystal panel 51b by passing through the field lens 43b. The red light LR guided to the second optical path OP2 goes incident on the image forming region of the liquid crystal panel 51r by passing through the field lens 43r. The green light LG guided to the third optical path OP3 goes incident on the image forming region of the liquid crystal panel 51g by passing through the relay system including the lens 45a, 45b, and 45c. Each of the liquid crystal panels 51b, 51r, and 51b is a non-luminous, transmissive light modulation device that changes a spatial distribution of the incident illumination light in the polarization direction. For the lights LB, LR, and LG of respective colors that go incident on the corresponding liquid crystal panels 51b, 51r, and 51g, the polarization state is adjusted pixel by pixel according to a driving signal or an image signal inputted to the respective liquid crystal panels 51b, 51r, and 51g as an electrical signal. In this instance, the polarization direction of the illumination lights that go incident on the respective liquid crystal panels 51b, 51r, and 51g is adjusted by the polarization filters 52b, 52r, and 52g, and modulation lights in a specific polarization direction are extracted from lights exiting from the respective liquid crystal panels 51b, 51r, and 51g.

The cross dichroic prism 60 is a light combining system, in which a first dichroic filter (to be more specific, a dielectric multi-layer film) 61, formed on a plane, for reflecting blue lights, and a second dichroic filter (to be more specific, a dielectric multi-layer film) 62, slightly bent at a position of a cross line CL, for reflecting green lights, are accommodated as a whole in a state to be orthogonal to each other. The cross dichroic prism 60 can reflect a blue light BL from the liquid crystal panel 51b on the first dichroic filter 61 to exit on the left side in a light traveling direction, allows a red light LR from the liquid crystal panel 51r to travel straight and exit by way of the both dichroic filters 61 and 62, and reflects a green light LG from the liquid crystal panel 51g on the second dichroic filter 62 to exit on the right side in the light traveling direction. Image lights combined in the cross dichroic prism 60 in this manner are projected onto a screen (not shown) by passing through the projection lens 70 used as a projection system at adequate magnification in the form of a color image.

Figure 2:
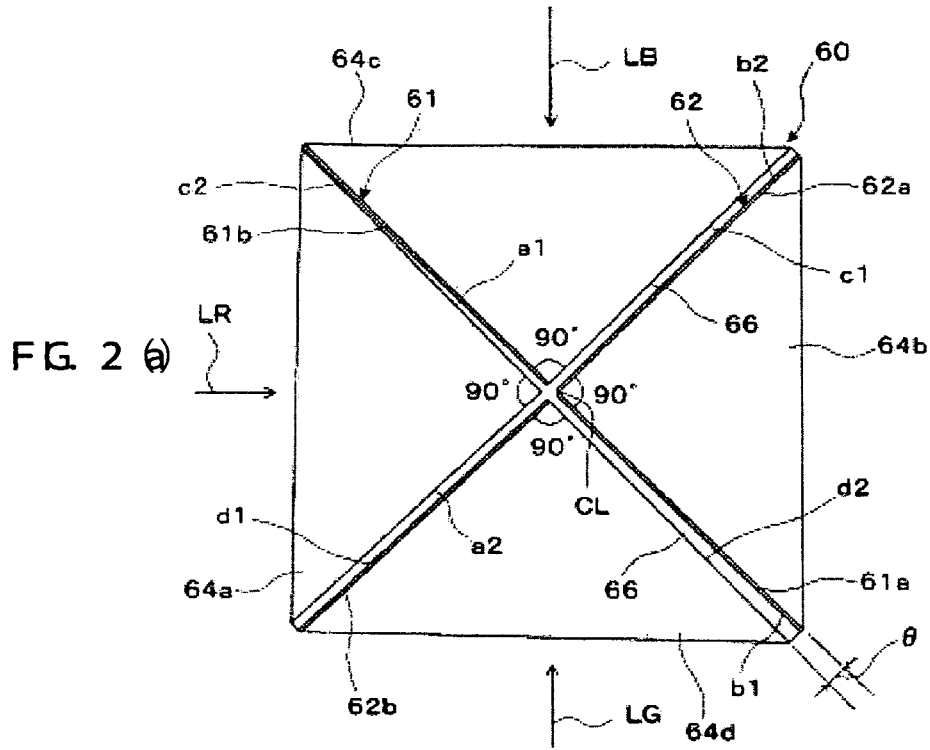
FIG. 2A is a plan view used to describe the structure of a dichroic prism.
FIG. 2B is a view used to describe the positional relation of dichroic filters.
Figure 2:
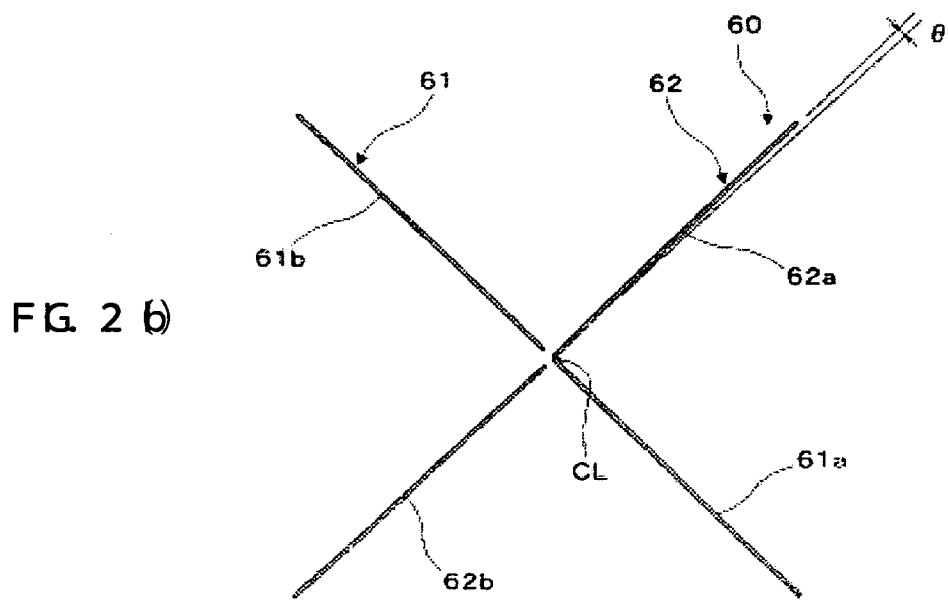

FIG. 2A is a plan view used to describe the structure of the cross dichroic prism 60 shown in FIG. 1. FIG. 2B is a view used to describe the positional relation of a pair of cross dichroic filters included in the cross dichroic prism 60.

As is shown in FIG. 2A, the cross dichroic prism 60 can include four rectangular prisms 64a, 64b, 64c, and 64d each having an isosceles right triangular bottom surface. The respective rectangular prisms 64a, 64b, 64c, and 64d are joined at their apex angles and laminated to each other with an adhesive agent 66, thereby forming a square prism as a whole. No dichroic filter is formed on the two orthogonal side surfaces a1 and a2 of the rectangular prism 64a. Meanwhile, first surface regions 61a and 62a, which are halves of the respective dichroic filters 61 and 62 divided along a virtual cross line CL, are formed across the entire two orthogonal side surfaces b1 and b2 of the rectangular prism 64b opposing the rectangular prism 64a. In addition, a second surface region 61b, which is the other half of the first dichroic filter 61, is formed on the side surface c2, which is one of the two orthogonal side surfaces c1 and c2 of the rectangular prism 64c, which is one of the two rectangular prisms 64c and 64d sandwiched between the two rectangular prisms 64a and 64b. Further, a second surface region 62*b*, which is the other half of the second dichroic filter 62, is formed on the side surface d1, which is one of the two orthogonal surfaces d1 and d2 of the rectangular prism 64*d*, which is the other one of the two rectangular prisms 64*c* and 64*d* sandwiched between the two rectangular prisms 64*a* and 64*b*.

The side surfaces a2 and d1 of a first set of the adjacent rectangular prisms 64*a* and 64*d* are placed oppositely to be parallel to each other. The remaining side surfaces a1 and d2 are immovably placed on the same plane. The side surfaces b2 and c1 of a second set of the adjacent rectangular prisms 64*b* and 64*c* are also placed oppositely to be parallel to each other. The remaining side surfaces b1 and c2 are immovably placed on the same plane. It should be noted, however, that the side surfaces a1 and d2 of the first set of the rectangular prisms 64*a* and 64*d* and the side surfaces b1 and c2 of the second set of the rectangular prisms 64*b* and 64*c* oppose each other and fixed to each other with a slight tilting angle θ. The first surface region 62*a* and the second surface region 62*b* of the dichroic filter 62 therefore produce the tilting angle θ with the cross line CL in between.

FIG. 2B is a view used to describe the positional relation of the pair of dichroic filters 61 and 62 included in the cross dichroic prism 60. The first surface region 61*a* and the second surface region 61*b* forming the first dichroic filter 61 are placed on the same plane passing through the cross line CL. The first surface region 62*a* and the second surface region 62*b* forming the other second dichroic filter 62 are displaced with respect to the reference angle, that is, they are placed to produce the slight tilting angle θ with the cross line CL in between. When the first and second surface regions 62*a* and 62*b* are slightly tilted to each other in this manner, the second dichroic filter 62 as a whole functions as an optical adjustment portion that increases/decreases the size of an image light of the green light LG relatively with respect to the sizes of the image lights of the blue light LB and the red light LR.

FIG. 3 is a view showing a modification of the cross dichroic prism 60 shown in FIG. 2A. The cross dichroic prism 60 can include two quasi-rectangular prisms 164*a* and 164*d* and two rectangular prisms 64*b* and 64*c*. In this case, the apex angles of the quasi-rectangular prisms 164*a* and 164*d* are (90°−θ) and (90°+θ), respectively. When configured in this manner, it is possible to produce a slight tilting angle θ between the two surface regions 62*a* and 62*b* forming the second dichroic filter 62 with the cross line CL in between while placing the two surface regions 61*a* and 61*b* forming the other first dichroic filter 61 on the same plane, by a work as simple as laminating the side surfaces of the respective prisms 164*a*, 164*d*, 64*b*, and 64*c* to be parallel to each other using an adhesive agent 66 of an equal thickness.

Figure 4:
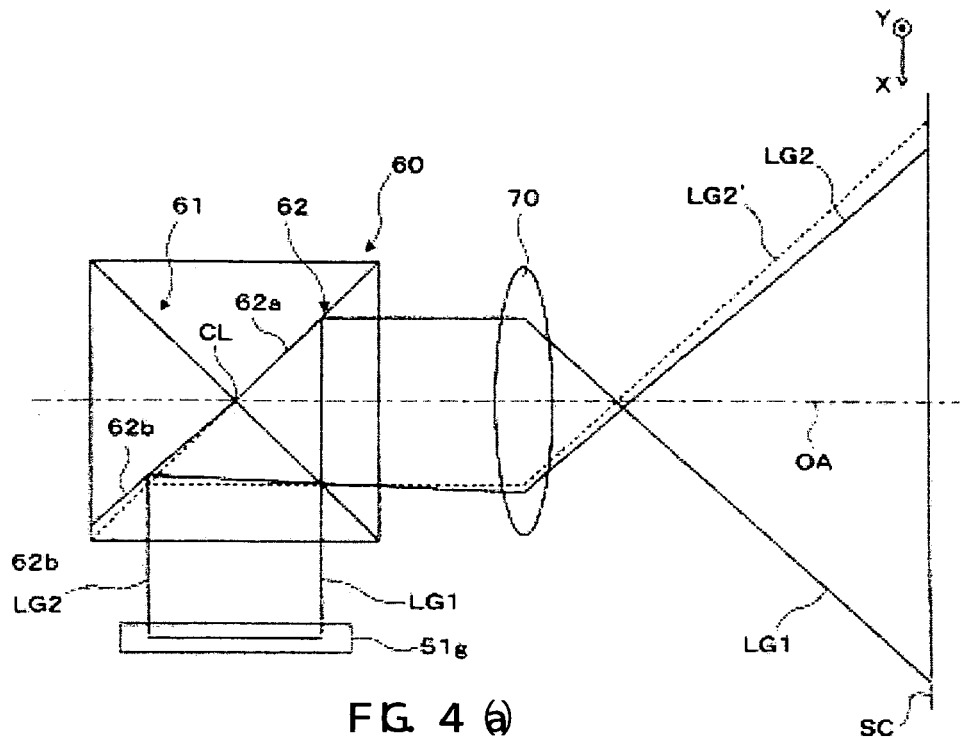
FIGS. 4A and 4B are views used to describe the function of the dichroic prism.
Figure 4:
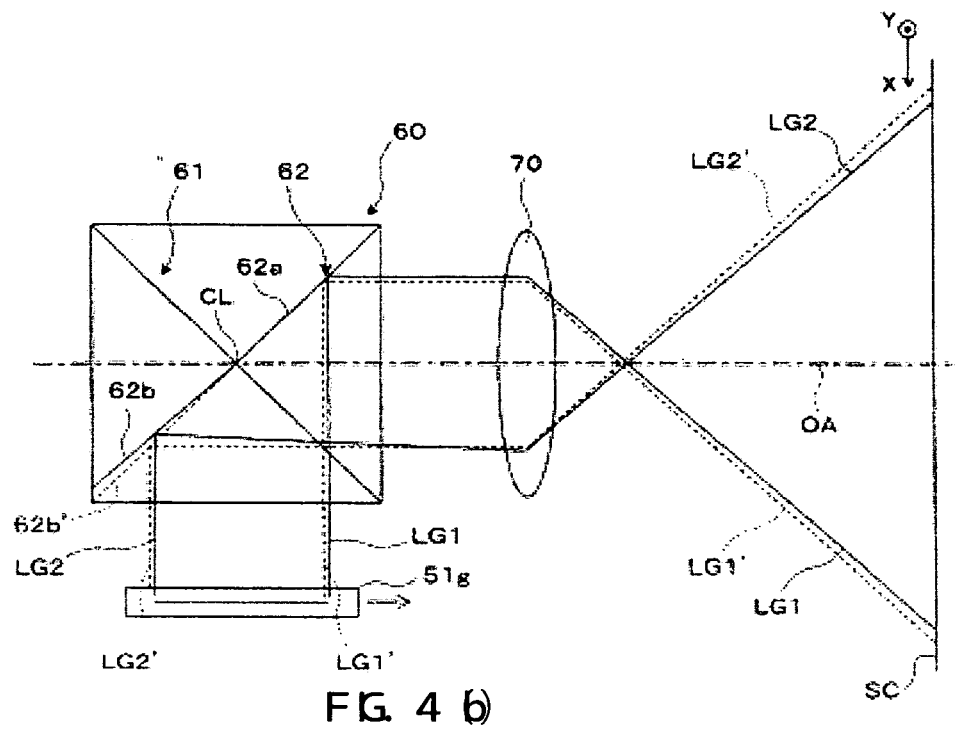

FIGS. 4A and 4B are views used to describe the function of the cross dichroic prisms 60 shown in FIG. 2A and FIG. 3 on a conceptual basis. As is shown in FIG. 4A, of image lights for green having passed through the both ends of the liquid crystal panel 51*g*, a green light LG1 that goes incident on the cross dichroic prism 60 on the right side of the sheet surface in reference to the cross line CL is reflected on the first surface region 62*a* to exit to the outside of the cross dichroic prism 60, and is projected onto the screen SC by passing through the projection lens 70 of a reversion projection type. Of the image lights for green having passed through the both ends of the liquid crystal panel 51*g*, a green light LG2 that goes incident on the cross dichroic prism 60 on the left side of the sheet surface in reference to the cross line CL is reflected on the second surface region 62*b* to exit to the outside of the cross dichroic prism 60, and is projected onto the screen SC by passing through the projection lens 70 of a reversion projection type. In this instance, because the first surface region 62*a* is slightly tilted with respect to the second surface region 62*b*, the green light LG2 goes incident on the second surface region 62*b* on the side closer to the optical axis OA than a virtual green light LG2' that is reflected on a non-tilted, virtual surface region 62*b*' and projected onto the screen SC by passing through the projection lens 70. In other words, a projection width of the green lights LG1 and LG2 that are reflected on the slightly-bent, protruding second dichroic filter 62 and projected onto the screen SC by passing through the projection lens 70, is narrower than a projection width in a normal projector having a flat second dichroic filter 62. This means that the width of a projected image for green on the screen SC can be reduced arbitrarily in a direction (the lateral direction of an image plane) perpendicular to the cross line CL by means of the cross dichroic prism 60 shown in FIGS. 4A and 4B. Because the other red light LR and blue light LB are unsusceptible to the function as described above, it is consequently possible to correct aberration of magnification of a projected image for green alone independently in the lateral direction.

As is shown in FIG. 4B, it is possible to move the positions of the green lights LG1 and LG2 projected onto the screen SC to the upper side of the sheet surface (to the left side of the image plane) as a whole by slightly displacing the liquid crystal panel 51*g* to the right side of the sheet surface from the state shown in FIG. 4A. In the case illustrated in the drawing, the incident positions on the screen SC of the green lights LG1 and LG2 are on the inner side by an equal distance from those of virtual green lights LG1' and LG2' reflected on the virtual surface region 62*b*'. This brings the center of the projected image for green into agreement with the optical axis OA, which can in turn prevent the occurrence of chromatic blur on the periphery (in particular, the both sides of the image plane) of a color image projected onto the screen SC.

Figure 5:
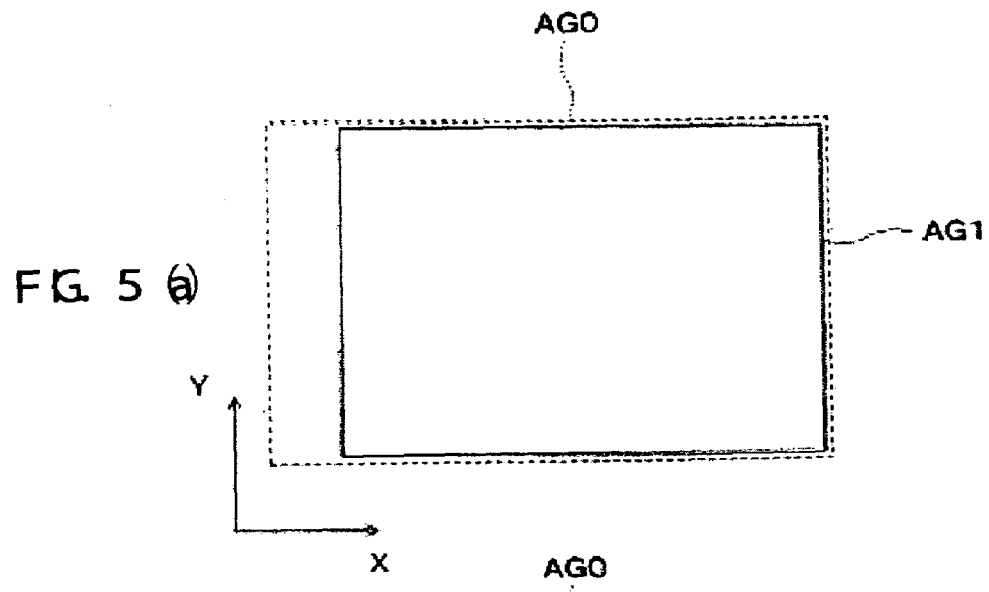
FIGS. 5A through 5C are views used to describe a manner in which a projected image for green is formed.
Figure 5:
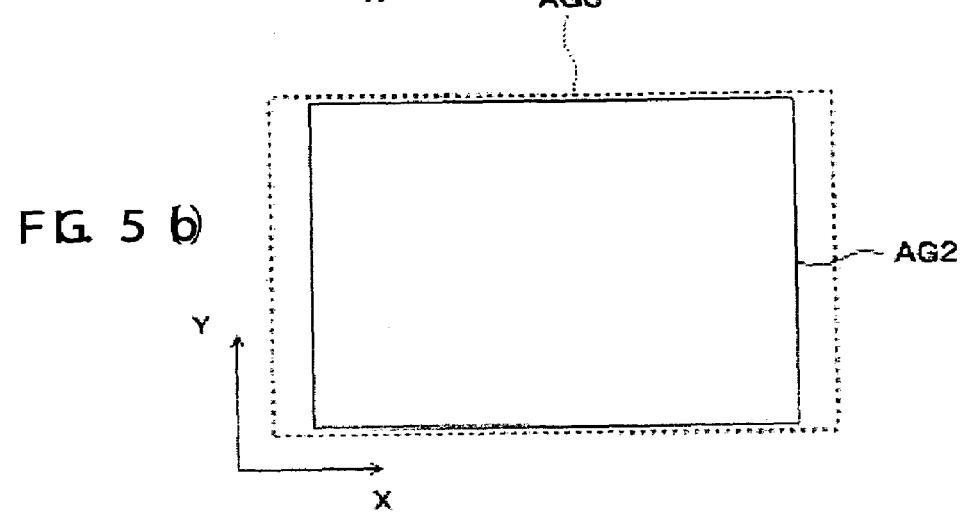
Figure 5:
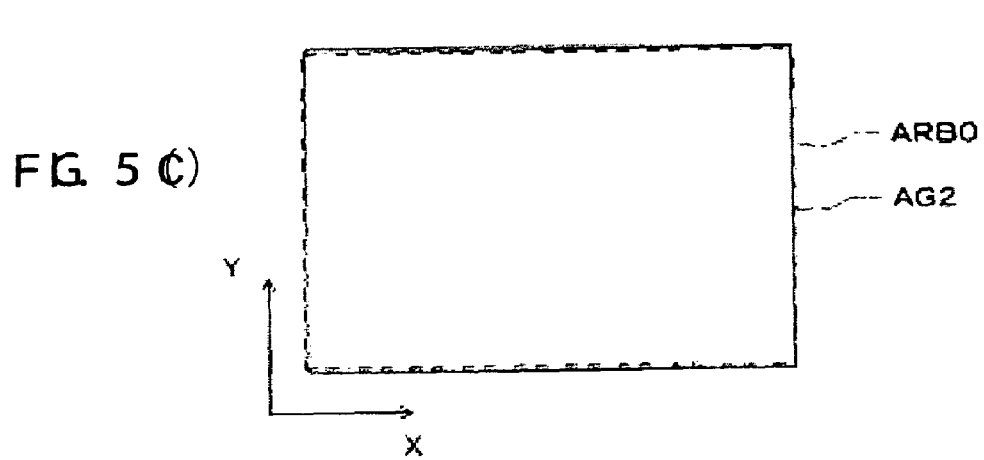

FIGS. 5A through 5C are views used to describe a projected image for green. Referring to FIG. 5A, a region AG0 indicated by a dotted line represents a virtual image projection region when the dichroic filter 62 is flat. A region AG1 indicated by a solid line represents an image projection region of the liquid crystal panel 51*g* using the dichroic filter 62 of this exemplary embodiment before the position adjustment. The both ends of the region AG0 in the lateral direction of the image plane, which is the longitudinal direction, correspond to the green lights LG1' and LG2' of FIG. 4A. The both ends of the region AG1 in the lateral direction of the image plane correspond to the green lights LG1 and LG2 of FIG. 4A.

Referring to FIG. 5B, a region AG2 indicated by a solid line represents an image projection region of the liquid crystal panel 51*g* using the dichroic filter 62 of this embodiment after the position adjustment. The both ends of the region AG2 in the lateral direction of the image plane, which is the longitudinal direction, correspond to the green lights LG1 and LG2 of FIG. 4B.

FIG. 5C shows the color combining result. It shows a state where the image projection region AG2 of the green light LG is brought into agreement or nearly into agreement with the image projection region ARB0 of the other red light LR and blue light LB by adjusting the titling angle θ provided between the two surface regions 62*a* and 62*b* forming the dichroic filter 62. In the condition shown in FIG. 5C, blur hardly occurs on the periphery of a color image made by combining the respective color lights LR, LG, and LB, and the pixel positions of the respective color lights LR, LG, and LB can be brought into agreement or nearly into agreement with one another. A high-definition color image having no chromatic shift can be therefore projected onto the screen.

Figure 6:
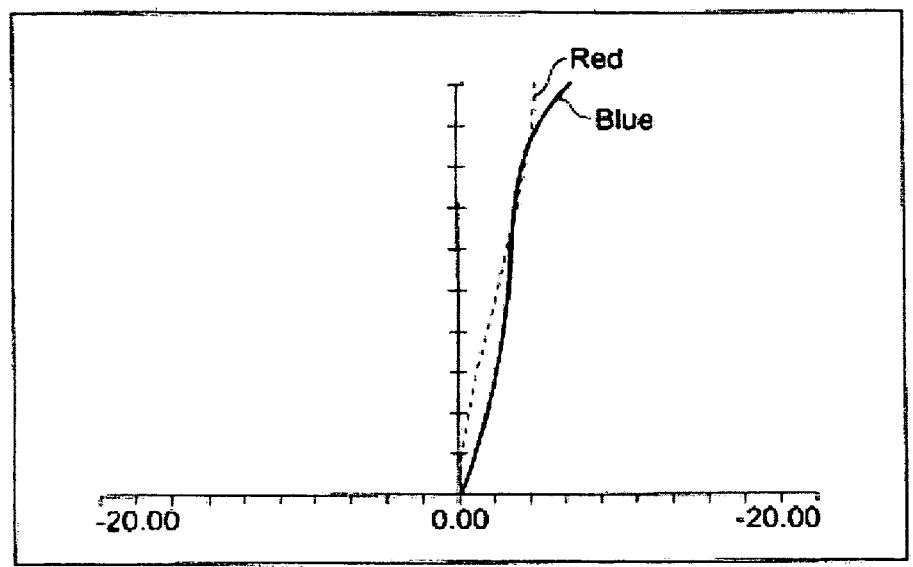
FIG. 6 is a graph used to describe a chromatic aberration of a projection lens.

FIG. 6 shows a graph used to describe chromatic aberrations of the projection lens 70. The abscissa is used for a quantity of aberration (chromatic aberration of magnification) with reference to a green light, and the ordinate is used for an image height. Referring to the graph, a solid line indicates a chromatic aberration of magnification of a blue light, and a dotted line indicates a chromatic aberration of magnification of a red light. As is obvious from the graph, the chromatic aberrations of magnification of a blue light and a red light agree with each other regardless of the values of the image height. In other words, it can be said that chromatic aberrations are corrected for a blue light and a red light with each other but a relatively large chromatic aberration remains for a green light in the projection lens 70. However, the relative chromatic aberration of magnification of a green light can be cancelled out when the cross dichroic prism 60 shown in FIG. 2A or FIG. 3 exerts the image scaling down function on the green light LG as is shown in FIGS. 5A through 5C.

The projection lens 70 having chromatic aberrations of magnification as shown in the graph of FIG. 6 can be manufactured with relative ease at a low cost in comparison with a highly accurate achromatic lens having corrected chromatic aberrations of magnification for respective colors including red, green, and blue almost completely. In addition, a projection lens having corrected chromatic aberrations of magnification for red and green almost completely has a large aberration for blue. In other words, an uncorrected aberration for blue in the projection lens having corrected chromatic aberrations of magnification for red and green is larger than an uncorrected aberration for green in the projector lens having corrected chromatic aberrations of magnification for red and blue. Hence, there is a need to increase a quantity of correction for blue.

Operations of the projector 10 of this exemplary embodiment will now be described. An illumination light from the light source 20 is subjected to homogenization by passing through the homogenization system 30 to have the same polarization direction. The illumination light is then divided into color lights on the first and second dichroic mirrors 41a and 41b provided in the color separation system 40, so that color lights LB, LR, and LG go incident on the liquid crystal panels 51b, 51r, and 51g, respectively. Each of the liquid crystal panels 51b, 51r, and 51g is modulated according to an image signal from the outside and therefore has a two-dimensional distribution of refractive index. The liquid crystal panels 51b, 51r, and 51g thereby modulate the respective color lights LB, LR, and LG two-dimensionally pixel by pixel. The respective color lights LB, LR, and LG modulated in the corresponding liquid crystal panels 51b, 51r, and 51g, that is, image lights, are combined in the cross dichroic prism 60, and then go incident on the projection lens 70. The image lights that come incident on the projection lens 70 are projected onto the unillustrated screen.

In the projector 10, the first surface region 62a and the second surface region 62b forming the dichroic filter 62 for reflecting green lights LG incorporated in the cross dichroic prism 60 can be formed to tilt with each other at a specific tilting angle θ. It is thus possible to adjust the size of an image light corresponding to the green light LG independently in response to the sizes of the image lights corresponding to the other color lights LB and LR for which chromatic aberrations are corrected with each other. The chromatic aberration of magnification of the color lights LB and LR with respect to the green light LG in the projection lens 70 can be cancelled out together with the cross dichroic prism 60 in the preceding stage. To be more specific, the cross dichroic prism 60 of a simple structure in which a tilting angle is given to the dichroic filter 62 for reflecting green lights, and the projection lens 70 having corrected two colors other than green collaborate to cancel out the chromatic aberrations of magnification for all the color lights LB, LR, and LG almost completely. Hence, although the projection lens 70 can be designed easily at a relatively low cost, a color image projected onto the screen is a high-definition, high-quality image having no chromatic shift.

In the projector 10, illuminance of the green light LG on the image forming region of the liquid crystal panel 51g can be adjusted using displacement of the lens 45b disposed in the third optical path OP3 for green. Generally, because visual sensitivity to the green light LG is relatively high, the green light LG gives considerable influences to a white balance. Also, a relative light quantity of the green light LG readily varies in the light source 20 provided with the lamp main body 21 comprising a high pressure mercury-vapor lamp. It is thus possible to adjust the white balance of the projector 10 effectively by adjusting illuminance of the green light LG on the image forming region of the liquid crystal panel 51g using displacement of the lens 45b. The high pressure mercury-vapor lamp has a tendency that a light quantity of the green light LG is larger than light quantities of the blue light LB and the red light LR. Hence, even when a light quantity of the green light LG is lost to some extent due to the enlargement of an illumination region caused by displacement of the lens 45b, there is no disadvantage to the adjustment of the white balance. Rather, because an illumination light from the light source 20 can be utilized to the greatest extent possible, the projector 10 configured as described above is able to project the brightest image while achieving natural color temperatures.

Besides a variance of a relative light quantity of the lamp, irregularities of the characteristic of the liquid crystal panel 51g, and irregularities of the wavelength selection characteristic of the dichroic mirrors 41a and 41b and the cross dichroic prism 60 are thought to be the factors that give influences to the white balance. The projector 10 of this exemplary embodiment, however, is able to set the white balance of the projector 10 to or nearly to the target value regardless of these factors causing a variance of a light quantity of the green light LG. Hence, neither the brightness nor the contrast of an image is sacrificed when the white balance is set.

Hereinafter, a projector of a second exemplary embodiment will be described. The projector of the second exemplary embodiment is of the same configuration as the projector of the first exemplary embodiment except for the structure of the cross dichroic prism. Hence, descriptions of the same portions are omitted herein.

Figure 7:
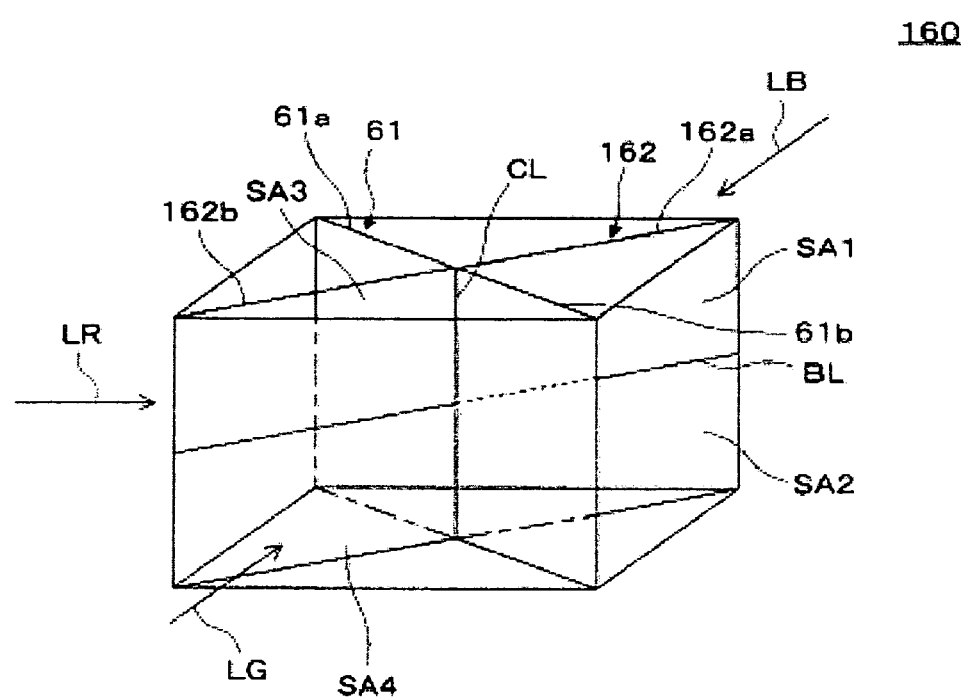
FIG. 7 is a perspective view used to describe the structure of a cross dichroic prism according to a second exemplary embodiment.

FIG. 7 is a perspective view used to describe the structure of a cross dichroic prism 160 in the projector of the second exemplary embodiment. The cross dichroic prism 160 can include a first dichroic filter 61, having a first surface region 61a and a second surface region 61b, that reflects a blue light LB and a second dichroic filter 162 that reflects a green light LG. The latter second dichroic filter 162 is divided into first through fourth surface regions SA1 through SA4. The first and second surface regions SA1 and SA2 on one side and the third and fourth surface regions SA3 and SA4 on the other side with the cross line CL in between produce a slight angle (comparable to the tilting angle θ of FIGS. 2A and 2B) with respect to the cross line CL. Also, given a border line BL as the boundary, the first and third surface regions SA1 and SA3 on the upper side of the drawing and the second and fourth surface regions SA2 and SA4 on the lower side of the drawing produce a slight angle (comparable to the tilting angle θ of FIGS. 2A and 2B). When configured in this manner, the dichroic filter 162, having a first surface region 162a and a second surface region 162b, is of the same shape as four side surfaces of a square pyramid protruding slightly in the incident direction of the green light LG.

When the cross dichroic prism 160 as described above is used, the width of a projected image for green on the screen can be reduced not only in a direction (the lateral direction of the image plane) perpendicular to the cross line CL, but also in a direction (longitudinal direction of the image plane) parallel to the cross line CL. It is thus possible to correct the magnification of the green light LG alone both in the lateral and longitudinal directions independently while maintaining the projection magnification of the other red light LR and the blue light LB intact.

Hereinafter, a projector of a third exemplary embodiment will be described. The projector of the third exemplary embodiment is of the same configuration as the projector of the first exemplary embodiment except for the structure of the cross dichroic prism. Hence, descriptions of the same portions are omitted herein.

FIG. 8 is a view used to describe the structure of a cross dichroic prism 260 in the projector of the third exemplary embodiment on a conceptual basis. The cross dichroic prism 260 can include a first dichroic filter 61 that reflects a blue light LB and a second dichroic filter 262 that reflects a green light LG. The latter second dichroic filter 262 can include a first surface region 262a and a second surface region 262b. Both of the surface regions 262a and 262b are present in the same plane including the cross line CL. In other words, a pair of the dichroic filters 61 and 262 incorporated in the cross dichroic prism 260 is not furnished with a function of correcting chromatic aberrations of magnification. However, a thin lens 268 is formed on the side surface SSG of the cross dichroic prism 260 on which the green light LG goes incident. The lens 268 is an optical element that adjusts the size of an image light for green projected onto the screen SC from the projection lens 70. The lens 268 can be formed integrally with the cross dichroic prism 260, or alternatively, the lens 268 may be manufactured separately and laminated later to the cross dichroic prism 260.

Even when the cross dichroic prism 260 configured as described above is used, the width of a projected image for green on the screen SC can be reduced in both the lateral and longitudinal directions of the image plane. It is thus possible to correct the magnification of the green light LG alone both in the lateral and longitudinal directions independently while maintaining the projection magnification of the other red light LR and the blue light LB intact.

It should be appreciated that the invention is not limited to the exemplary embodiments above, and the invention can be implemented in various forms without deviating from the scope of the invention. For instance, modifications as follows are possible.

The projectors 10 of the exemplary embodiments above use the high pressure mercury-vapor lamp as the light source 20. However, other kinds of lamps, such as a metal halide lamp, may be used instead of the high pressure mercury-vapor lamp. In this case, too, not only is it possible to correct a chromatic aberration of magnification for green alone using the cross dichroic prisms 60, 160, and 260, but it is also possible to adjust the white balance of an illumination light from the lamp light source as needed by adjusting the position of any of the lenses 45a, 45b, and 45c forming the relay system.

In the first exemplary embodiment, the cross dichroic prism 60 corrects a chromatic aberration of magnification for green in the lateral direction of the image plane using the dichroic filter 62 that is bent at a slight tilting angle. The dichroic filter 62, however, can be replaced by a filter provided with a curved surface having an adequate curvature, such as a cylindrical surface. Also, in the second exemplary embodiment, the dichroic prism 160 corrects a chromatic aberration of magnification for green in both the lateral and longitudinal directions of the image plane using the dichroic filter 162 that protrudes in the shape of a square pyramid. However, the dichroic filter 162 may be replaced by a filter provided with a spherical surface having an adequate curvature.

The exemplary embodiments above have been described on the assumption that a chromatic aberration is left in the projection lens 70 such that makes the image projection regions of the red light LR and the blue light LB smaller than the image projection region of the green light LG. However, there may be a case where a chromatic aberration is left in the projector 70 such that makes the image projection regions of the red light LR and the blue light LB larger than the image projection region of the green light LG. In this case, for example, in the first exemplary embodiment, the sign of the titling direction (the direction of convexity) of the pair of surface regions 62a and 62b forming the dichroic filter 62 can be inversed, so that the surface regions 62a and 62b become concave in the incident direction of the green light LG. When configured in this manner, the image projection region of the green light LG can be approximated to the image projection regions of the other color lights LR and LB. In the second exemplary embodiment, the image projection region of the green light LG can be brought into agreement with the image projection regions of the other color lights LR and LB by forming the four surface regions SA1 through SA4 forming the dichroic filter 162 to be concave in the incident direction of the green light LG.

In the exemplary embodiments above, the dichroic filter 61 has the characteristic to reflect the blue light LB. However, the dichroic filter 61 can have a characteristic to reflect the red light LR. In this case, the optical paths of the blue light LB and the red light LR are exchanged.

In the exemplary embodiments above, two fly-eye systems 31 and 32 are used to divide a light from the light source 20 into plural partial lights. The invention, however, is also applicable to a projector that does not use such a fly-eye system, that is, a lens array. Further, the fly-eye systems 31 and 32 may be replaced by rod integrators.

The projector 10 can use the polarization conversion member 34 that converts a light from the light source 20 into a polarized light in a specific direction. The invention, however, is also applicable to a projector that does not use such a polarization conversion member 34.

The exemplary embodiments above have described cases where the invention is applied to a transmissive projector. The invention, however, is also applicable to a reflective projector. The term transmissive means that the light valve including the liquid crystal panel is of a light transmitting type. The term reflective means that the light valve is of a light reflecting type. In the case of a reflective projector, the light valve can comprise the liquid crystal panel alone, and a pair of polarizers can be omitted. The light modulation device is not limited to the liquid crystal panel, and, for example, a light modulation device using a micro mirror can be adopted as well.

A projector includes a front projector that projects an image from a direction in which the viewer views the projection surface, and a rear projector that projects an image from the opposite side of a direction in which the viewer views the projection surface. The configuration of the projector shown in FIG. 1 is applicable to the both types.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A projector, comprising:
an illumination device that emits an illumination light;
a color separation system that separates the illumination light emitted from the illumination device into a blue light, a red light, and a green light, and that guides the blue light and the red light, respectively, to first and second optical paths, and the green light to a third optical path that includes a relay system;
first through third light modulation devices that are provided, respectively, in the first through third optical paths, and that are illuminated by the blue light, the red light, and the green light, respectively;
a light combining system that has a first dichroic filter that reflects one of the blue light and the red light, and a second dichroic filter that reflects the green light which are placed in a crossed state, and that combines image lights of respective colors exiting from the first through third light modulation devices to go incident on the first and second dichroic filters in specific directions that differ from each other;
a projection system that projects a combined light exiting from the light combining system while correcting chromatic aberrations of magnification of the blue light and the red light with respect to the green light to have a same sign;
an optical adjustment portion that adjusts a size of an image light corresponding to the green light of the combined light exiting from the light combining system in response to a size of image lights corresponding to the blue light and the red light; and
the light combining system including a combination of four rectangular prisms, each prism having an isosceles right triangular bottom surface, and the four rectangular prisms being joined at their apex such that a specific tilting angle is produced between first and second surface regions that are halves of the second dichroic filter divided by the first dichroic filter crossing the second dichroic filter.

2. The projector according to claim 1,
the projection system correcting chromatic aberrations of magnification of the blue light and the red light with respect to the green light to be equal or nearly equal and to have the same sign.

3. The projector according to claim 1,
projection magnification of the blue light and the red light being smaller than projection magnification of the green light in the projection system.

4. The projector according to claim 1,
a cross line between the first and second surface regions extending in a direction perpendicular to a longitudinal direction of an image projected from the projection system.

5. The projector according to claim 1,
the relay system including a first lens disposed on a light incident side, a second lens disposed on a light exiting side, and a third lens disposed between the first and second lenses.

6. The projector according to claim 1,
the first dichroic filter reflecting the blue light.

7. A projector, comprising:
an illumination device that emits an illumination light;
a color separation system that separates the illumination light emitted from the illumination device into a blue light, a red light, and a green light, and that guides the blue light and the red light, respectively, to first and second optical paths, and the green light to a third optical path that includes a relay system;
first through third light modulation devices that are provided, respectively, in the first through third optical paths, and that are illuminated by the blue light, the red light, and the green light, respectively;
a light combining system that has a first dichroic filter that reflects one of the blue light and the red light, and a second dichroic filter that reflects the green light which are placed in a crossed state, and that combines image lights of respective colors exiting from the first through third light modulation devices to go incident on the first and second dichroic filters in specific directions that differ from each other;
a projection system that projects a combined light exiting from the light combining system while correcting chromatic aberrations of magnification of the blue light and the red light with respect to the green light to have a same sign;
an optical adjustment portion that adjusts a size of an image light corresponding to the green light of the combined light exiting from the light combining system in response to a size of image lights corresponding to the blue light and the red light; and
the light combining system being a combination of four rectangular prisms, two of the prisms having an isosceles right triangular bottom surface, one of the prisms having an isosceles triangular face wherein its apex angle is less than 90°, one of the prisms having an isosceles triangular face wherein its apex angle is greater than 9020 , and the four rectangular prisms being joined at their apex such that a specific tilting angle is produced between first and second surface regions that are halves of the second dichroic filter divided by the first dichroic filter crossing the second dichroic filter.

8. The projector according to claim 7,
the projection system correcting chromatic aberrations of magnification of the blue light and the red light with respect to the green light to be equal or nearly equal and to have the same sign.

9. The projector according to claim 7,
projection magnification of the blue light and the red light being smaller than projection magnification of the green light in the projection system.

10. The projector according to claim 7,
a cross line between the first and second surface regions extending in a direction perpendicular to a longitudinal direction of an image projected from the projection system.

11. The projector according to claim 7,
the relay system including a first lens disposed on a light incident side, a second lens disposed on a light exiting side, and a third lens disposed between the first and second lenses.

12. The projector according to claim 7,
the first dichroic filter reflecting the blue light.

* * * * *